United States Patent [19]

Eninger et al.

[11] Patent Number: 5,036,905
[45] Date of Patent: Aug. 6, 1991

[54] HIGH EFFICIENCY HEAT EXCHANGER

[75] Inventors: James E. Eninger, Torrance; David Antonink, Los Angeles, both of Calif.

[73] Assignee: The United States of America as represented by the Secretary of the Air Force, Washington, D.C.

[21] Appl. No.: 428,385

[22] Filed: Oct. 26, 1989

[51] Int. Cl.⁵ .......................... B64G 1/50; F28D 15/02
[52] U.S. Cl. ........................................ 165/41; 165/46; 165/86; 165/104.26; 244/163; 244/158 R
[58] Field of Search ................. 165/46, 41, 86, 104.26; 244/158 R, 163

[56] References Cited

U.S. PATENT DOCUMENTS

| | | | |
|---|---|---|---|
| 4,040,478 | 8/1977 | Pogson et al. | 165/46 |
| 4,133,376 | 1/1979 | Eilenberg et al. | |
| 4,706,740 | 11/1987 | Mahefkey | |
| 4,727,932 | 3/1988 | Mahefkey | 165/41 |
| 4,738,304 | 4/1988 | Chalmers et al. | |
| 4,756,493 | 7/1988 | Camaret | 244/158 R |
| 4,832,113 | 5/1989 | Mims et al. | 165/41 |

OTHER PUBLICATIONS

"Haufkondensation an feingewellten Oberflachen bei Berucksichtgung der Oberflachenspannungen", by V. Gregorig, in Zeitschrift fur angewandlte Mathematik und Physik, vol. V, pp. 33-36 (Mar. 1954).
"Condensation Coefficient of Water", by K. Navabian et al, Chem Eng Sci, vol. 18, pp. 651-660 (Jun. 1963).
Chalmers, D. R., *Application of Capillary Pumped Loop. . . to Large Spacecraft*, AIAA/ASME 4th Joint . . . Conference, AIAA, NYC, NY, May 1986, pp. 1-13.

Primary Examiner—Albert W. Davis, Jr.
Attorney, Agent, or Firm—Bobby D. Scearce; Donald J. Singer

[57] ABSTRACT

A high efficiency deployable heat radiator system for radiating heat generated at a source of heat aboard an orbiting spacecraft or like vehicle is described which comprises a first subsystem for circulating liquid heat exchange medium into heat exchange relationship with the heat source and for conducting vaporous medium generated at the heat source to a manifold; one or more interconnected movable radiator panels each including a pair of spaced wall members defining heat radiating surfaces; a plurality of heat pipes each having an elongated condenser end disposed between wall members of the radiator panels and in heat exchange relationship with the heat radiating surfaces; a manifold for conducting vaporous medium from the source into heat exchange contact with the evaporator ends of the heat pipes; an interface structure interconnecting the evaporator end of each heat pipe with the manifold and including a tubular member enclosing each evaporator end for conducting vaporous heat exchange medium into contact with the evaporator end and conducting condensed heat exchange medium back toward the source of heat; and wherein each heat pipe includes a flexible portion between the interface structure and the first panel and between panels so that the panels may be selectively moved between folded and deployed positions. The evaporator ends of the heat pipes and the inner surface of the tubular members of the interface structure are preferably grooved to promote heat exchange at the evaporator ends of the heat pipes.

10 Claims, 3 Drawing Sheets

HIGH EFFICIENCY HEAT EXCHANGER

RIGHTS OF THE GOVERNMENT

The invention described herein may be manufactured and used by or for the government of the United States for all governmental purposes without the payment of any royalty.

BACKGROUND OF THE INVENTION

The present invention relates generally to systems for radiating heat from a spacecraft, orbiting vehicle or the like, and more particularly to an improved high efficiency, deployable two-phase heat exchange system.

In the operation of spacecraft in earth orbit, high peak power generation during certain portions of the duty cycle ordinarily require that a radiator system for rejecting waste heat generated aboard the spacecraft be sized to accommodate large heat loads. A conventional heat radiator system typically comprises a two-phase (liquid/vapor) closed system having large radiating surfaces and takes advantage of a high boiling heat transfer rate of the liquid medium. Such a system is susceptible to damage by invasive laser radiation directed onto the liquid tube or heat radiating surfaces which may cause overpressure and overheating within the system and/or by micrometeroid penetration, which damage may affect onboard operating systems the continued functioning of which requires efficient heat rejection.

Representative two-phase systems include those described by or referenced in U.S. Pat. No. 3,496,995 ("Furlable Heat Exchanger"), U.S. Pat. No. 4,212,347 ("Unfurlable Heat Pipe"), U.S. Pat. No. 4,706,740 ("Ventable Survivable Heat Pipe Vapor Chamber Spacecraft Radiator") and U.S. Pat. No. 4,727,932 ("Expandable Pulse Power Spacecraft Radiator").

Prior art systems such as those just cited are characterized by a single liquid/vapor heat exchange system which may be susceptible to substantial damage by invasive laser irradiation or by micrometeoroid impact, which in turn may threaten the continued operation of systems from which heat is to be removed. Further, most prior art systems are characterized by a high degree of expansion (100 meters or more) in a high heat rejection mode, which presents a substantial cross section for micrometeoroid impact and for detection in potentially hostile situations, and which generates a moment about the vehicle resulting in impaired maneuverability thereof.

Conventional heat exchanger structures applied to a two-subsystem configuration suffer from two fundamental shortcomings. First, those structures that use condensation heat transfer rely on gravity to drain condensate from the heat transfer surface. In near zero gravity, a condensate layer builds up on the heat transfer surface and results in a large temperature drop. Second, conventional structures that would use clamped joints between the two sub-systems are generally massive, and have poor heat transfer efficiency that result in a large temperature drop.

The invention eliminates or reduces in critical importance deficiencies in prior art systems by providing a deployable, two-subsystem based radiator system for radiating heat from an orbiting vehicle comprising a plurality of deployable, retractable panels thermally coupled by variable conductance heat pipes with flexible joints. Each module contains a heat transfer interface at which vapor from the heat transport subsystem condenses directly on the outer walls of the radiator heat pipes having grooved surfaces for facilitating condensation. Vapor and liquid lines of each module are housed inside a micrometeoroid shielded boom configured to be flexible and steerable to promote survivability and to optimize heat exchange efficiency. The two-subsystem structure characteristic of the invention is substantially less vulnerable to hostile or natural threats. Further, separate interfacing heat exchange systems, one for conducting heat away from onboard operating systems and a second for radiating that heat into space, include separate heat exchange media which allows versatility in temperature range of operation of the two subsystems.

It is therefore a principal object of the invention to provide a heat rejection system for an orbiting satellite or like vehicle.

It a further object of the invention to provide a deployable heat radiator having large heat rejection capability.

It is yet a further object of the invention to provide a two-subsystem heat rejection system for an orbiting vehicle including a deployable radiator having minimal cross section for detectability or micrometeoroid impact in the deployed condition.

These and other objects of the invention will become apparent as the detailed description of representative embodiments proceeds.

SUMMARY OF THE INVENTION

In accordance with the foregoing principles and objects of the invention, a high efficiency deployable heat radiator system for radiating heat generated at a source of heat aboard an orbiting spacecraft or like vehicle is described which comprises a first subsystem for circulating liquid heat exchange medium into heat exchange relationship with the heat source and for conducting vaporous medium generated at the heat source to a manifold; one or more interconnected movable radiator panels each including a pair of spaced wall members defining heat radiating surfaces; a plurality of heat pipes each having an elongated condenser end disposed between the wall members of the radiator panels in heat exchange relationship with the heat radiating surfaces; a manifold for conducting vaporous medium from the source into heat exchange contact with the evaporator ends of the heat pipes; an interface structure interconnecting the evaporator end of each heat pipe with the manifold and including a tubular member enclosing each evaporator end for conducting vaporous heat exchange medium into contact with the evaporator end and conducting condensed heat exchange medium back toward the source of heat; and wherein each heat pipe includes a flexible portion between the interface structure and the first panel and between panels so that the panels may be selectively moved between folded and deployed positions. The evaporator ends of the heat pipes and the inner surface of the tubular members of the interface structure are preferably grooved to promote heat exchange at the evaporator ends of the heat pipes.

DESCRIPTION OF THE DRAWINGS

The invention will be more clearly understood from the following detailed description of representative embodiments thereof read in conjunction with the accompanying drawings wherein.

DETAILED DESCRIPTION

Figure 1:
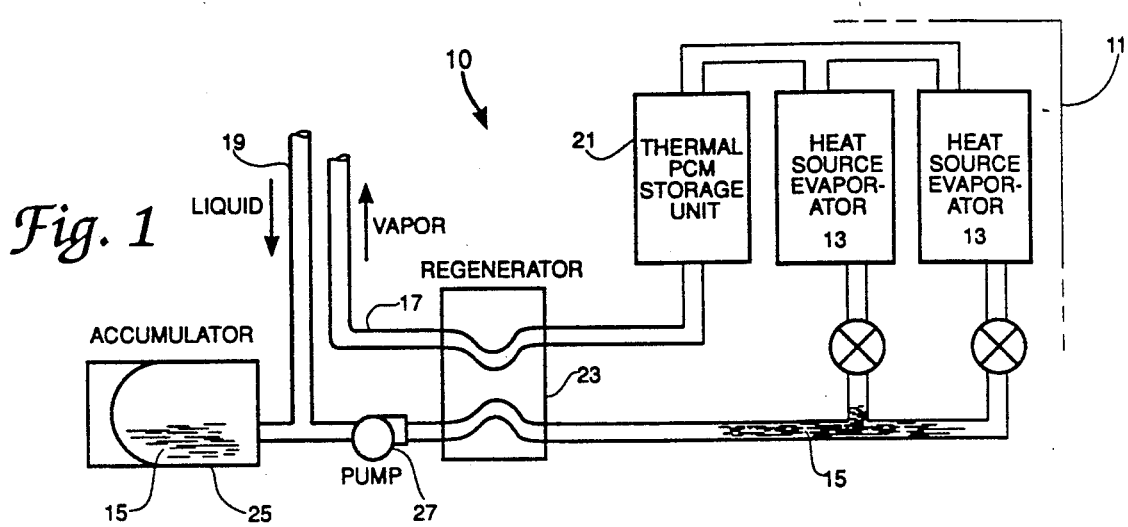
FIG. 1 is a schematic of a representative heat transport and management subsystem of a spacecraft or like vehicle.

Referring now to the drawings, FIG. 1 is schematic of a heat transport and management subsystem 10 which may be operatively connected to or form an integral part of a spacecraft or like vehicle 11 (represented by peripheral broken line). Subsystem 10 may typically include one or more heat source evaporators 13 representing systems within vehicle 11 from which heat is to be rejected in the operation of the invention, and past or through which heat exchange medium 15 may be flowed in heat exchange relationship to accomplish rejection of heat from vehicle 11. Heat exchange medium 15 may typically comprise hydrogen, oxygen, nitrogen, a hydrocarbon such as ethane, methanol, a fluorocarbon such as freon, ammonia, water, or a liquid metal such as mercury, potassium, lithium or sodium, as would occur to the skilled artisan, as providing satisfactory operation at temperatures of 15° to 2000° K. Subsystem 10 is operatively connected to the radiator of the invention described in more detail below, through vapor supply line 17 carrying heat laden vaporous heat exchange medium 15, and liquid return line 19 through which condensed heat exchange medium 15 flows toward subsystem 10 after the vapor has surrendered heat in the operation of the invention. Thermal storage unit 21 may be disposed in line with evaporators 13 in order to store heat during high peak output. Regenerator 23 may be disposed across vapor supply line 17 and liquid return line 19 in order to condition incoming liquid heat exchange medium 15. Accumulator 25 in liquid return line 19 may provide a reservoir for heat exchange medium 15, and pump 27 circulates heat exchange medium 15 throughout subsystem 10 and the radiator of the invention connected thereto.

Figure 2:
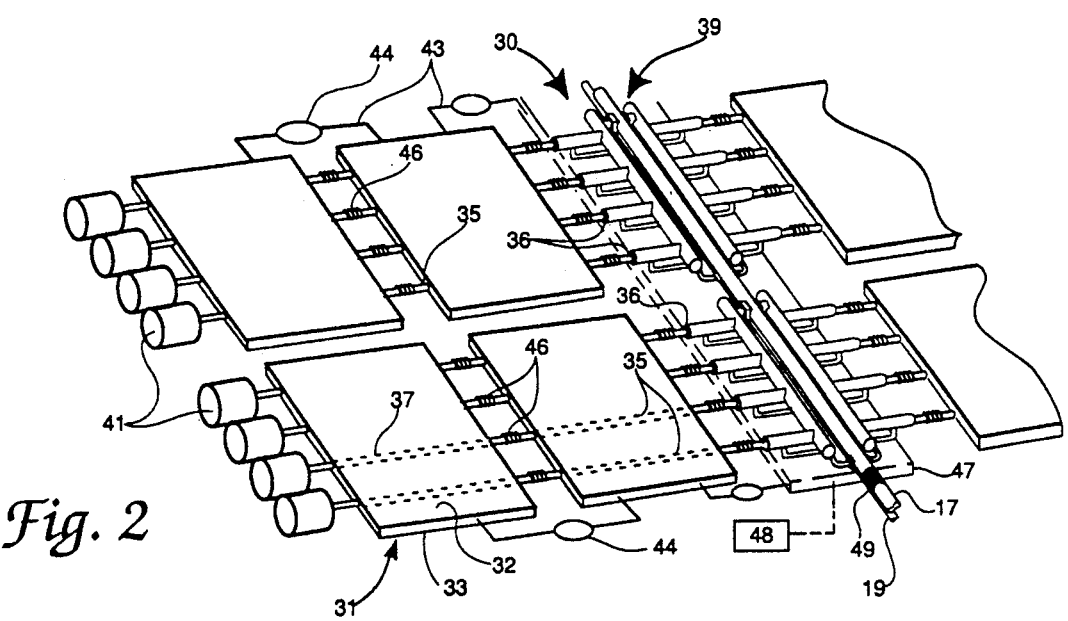
FIG. 2 is a schematic perspective view of a radiator of the invention in the deployed condition.
Figure 3:
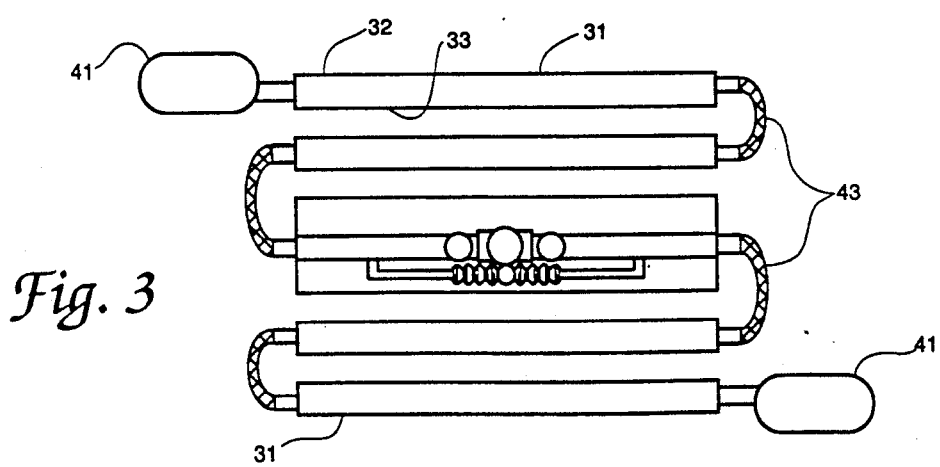
FIG. 3 is a schematic end view of the radiator of FIG. 2 in the retracted or stored condition.

Referring to FIG. 2, shown therein is a schematic perspective view of representative radiator 30 of the invention in the deployed condition. FIG. 3 shows schematically radiator 30 of FIG. 2 in a stored configuration. Radiator 30 typically comprises a plurality of radiator panels 31 having upper and lower heat radiating surfaces 32, 33. Radiator panels 31 may typically comprise wall members of aluminum, titanium, metal-graphite composite, steel, niobium, or other material having good temperature resistant, heat radiating and thermostructural/thermomechanical properties. A plurality of separate independently operating heat pipes 35 extend through each panel 31. The respective evaporator ends 36 of heat pipes 35 are disposed in heat exchange relationship with manifold 39 which conducts and distributes heat exchange medium 15 from vapor supply line 17 of subsystem 10 (FIG. 1) across evaporator ends 36. Variable conductance heat pipes, particularly of the nonarterial type, known for reliable priming and start-up characteristics, may be a preferable heat pipe 35 arrangement. Each heat pipe 35 is connected in heat exchange relationship at condenser ends 37 thereof with upper and lower surfaces 32, 33 of radiator panels 31 so that as heat is radiated at surfaces 32, 33, condensation of heat exchange medium at condenser ends 37 is achieved in the operation of heat pipes 35. Gas reservoirs 41 may be disposed at the extreme distal ends of condenser ends 37 to provide volume for non-condensable control gas required for variable conductance operation of each heat pipe 35. A plurality of independently operating heat pipes 35 are included within radiator panels 31 so that damage to one or more of heat pipes 35 as by micrometeoroid impact, hostile laser irradiation or other hazards, can be sustained without destroying the total heat rejection capability of the overall system comprising radiator 30. Specific detailed representative structures for heat pipes 35 and the heat exchange configurations between evaporator ends 36 and manifold 39 are described in detail below in relation to FIGS. 4 and 5.

Radiator panels 31 preferably comprise separate modular units which may be selectively folded and extended between a stored condition depicted in FIG. 3 and the deployed condition depicted in FIG. 2. Accordingly, means such as in the form of connector arms 43 and motors 44 may interconnect radiator panels 31 as suggested in FIG. 2 to provide controlled extendability and retractability to panels 31. Each heat pipe 35 therefore has along the condenser ends thereof a flexible joint 46 portion to accommodate folding of panels 31 to the stored condition suggested in FIG. 3.

Manifold 39 and the heat exchange interface structure between subsystem 10 and radiator 30 (described in more detail below) may preferably be housed within a micrometeoroid shielded boom 47 (in FIG. 2 only bottom half shown) which may be connected to vehicle 11 via suitable motor means 48 for selectively orienting or steering the entire structure including manifold 39 and all foldable radiator panels 31. Vapor supply line 17 and liquid return line 19 may accordingly include a flexible joint 49. The steerability and micrometeoroid impact resistance of boom 47 together with retractability of panels 31 ensures to the extend practical survivability of vehicle 11 against both natural and hostile threats. For example, radiator panels 31 may be retracted and then oriented edge on to a threat in order to minimize exposure of radiator surfaces 32, 33. In addition, steerability of radiator 30 allows selectable orientation which minimizes effective radiative sink temperature and allows minimum sizing for radiator panels 31.

Figure 4:
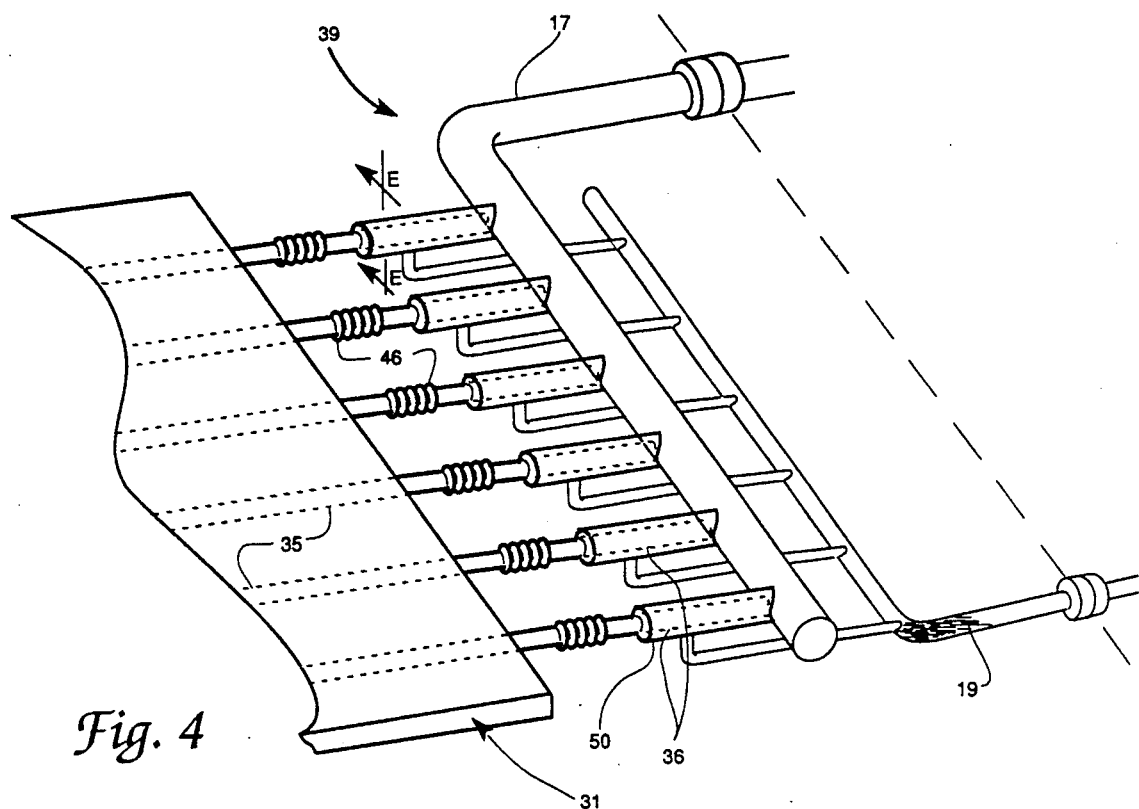
FIG. 4 is a schematic perspective view of the manifold arrangement and interface with the heat pipes of one radiator panel of the FIG. 1 system.
Figure 5:
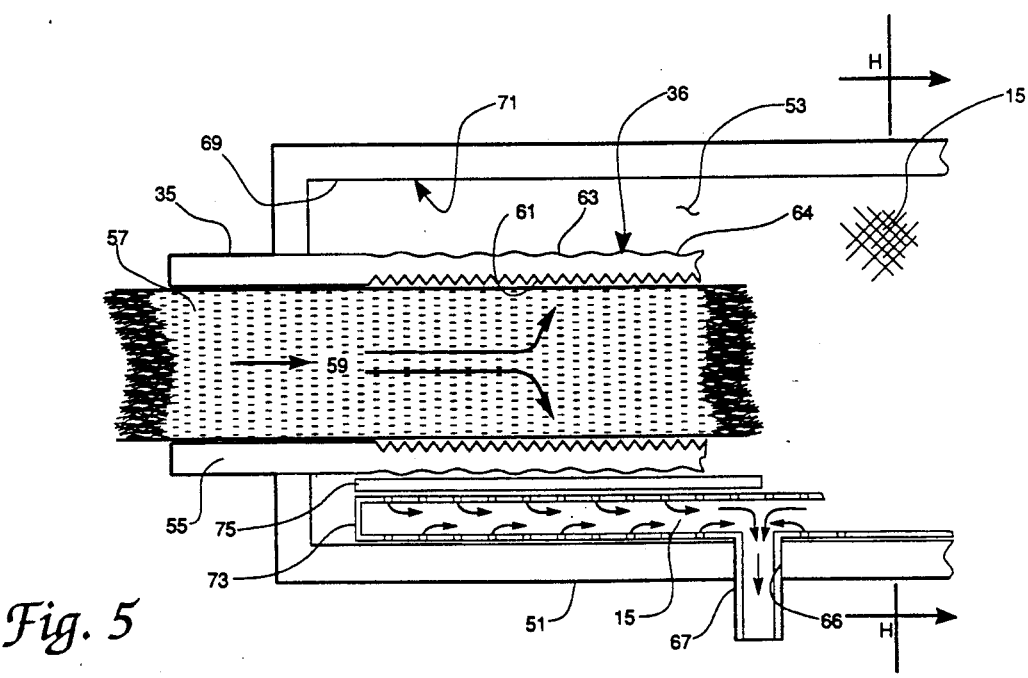
FIG. 5 is an axial sectional view along lines E—E of the heat pipe/manifold interface of FIG. 4.
Figure 6:
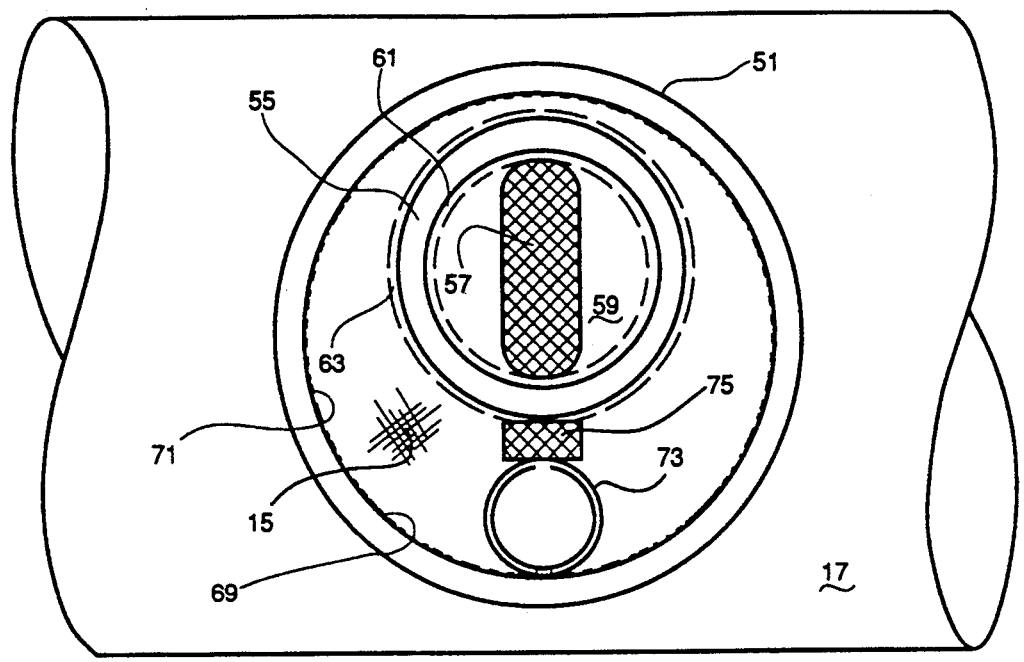
FIG. 6 is a view along lines H—H of FIG. 5.

Referring now to FIG. 4, shown therein is a schematic perspective view of the manifold 39 arrangement and interface with heat pipes 35 of one radiator panel 31 of FIG. 2. Manifold 39 provides a high-efficiency heat transfer interface between vaporous heat exchange medium 15 conducted through vapor supply line 17 from sources of heat within vehicle 11, past the evaporator ends 36 of heat pipes 35, and back toward the heat generating systems of vehicle 11 via liquid return line 19. The interface structure 50 between heat transfer subsystem 10 (FIG. 1) and radiator 30 system of the invention is shown in detail in the sectional views of FIGS. 5 and 6. FIG. 5 is a view along lines E—E of FIG. 4. FIG. 6 is a view along lines H—H of FIG. 5.

The heat pipe/manifold interface configuration may comprise that shown in FIG. 5 wherein the evaporator end 36 of each heat pipe 35 is encased in condenser shell 51 of cylindrical structure surrounding evaporator end 36 and defining passageway 53 therearound communicating with vapor supply line 17 at manifold 39. Heat pipe 35 typically comprises tubular member 55 of metallic or other high heat conducting material enclosing wick 57 for facilitating flow of liquid heat exchange medium 59 toward evaporator end 36 of heat pipe 35. Suitable two-phase liquid/vapor heat exchange materials for medium 59 typically include those listed above as comprising heat exchange medium 15 of subsystem 10, for operation at temperatures of 15° to 2000° K. Wick 57 may comprise stainless steel, aluminum, nickel or other material conventionally used in heat pipe applications and may preferably be in the form of the graded density, slab structure suggested in FIGS. 5, 6. In accordance with an attribute of heat pipe 35 of the invention, annular evaporation grooves 61 are defined on the inner surface of tubular member 55 to promote evaporation of liquid heat exchange medium 59 within heat pipe 35 contacting grooves 61. Condensation grooves 63 may be defined on exterior surface 64 of evaporator end 36 to promote condensation of vaporous heat exchange medium 15 thereon. In accordance then with an attribute of the invention, vaporous medium 15 from subsystem 10 (FIG. 1) condenses directly on the outer surface 64 of each heat pipe 35 at interface structure 50. Direct condensation eliminates high thermal resistances associated with conventional couplings using contact interfaces.

Heat transfer within grooves 61, 63 may be optimized by the skilled artisan practicing the invention through selection of groove size, density and profile (see, e.g. Gregorig, "Haufkondensation an feingewellten Oberflachen bei Berucksichtgung der Oberflachenspannungen", in Zeitschrift fur angewandlte Mathematik und Physik, Vol V, pp 36–49 (1954); and Navabian et al, "Condensation Coefficient of Water", Chem Eng Sci, Vol 18, pp 651–660 (1963)). The optimum profile for a particular operating condition depends on the condensation rate and fluid properties of the heat exchange medium. In the selection of groove configuration for vaporization grooves 61, a high heat transfer coefficient is achieved by maximizing groove density (grooves per inch); since evaporation takes place along the contact line between a liquid meniscus of the heat exchange medium and the groove wall, the heat transfer coefficient is proportional to total length of contact line per unit area or to the number of grooves per inch. However, the heat transfer coefficient cannot be increased indefinitely by increasing groove density since a point is reached at which the groove becomes too small to distribute liquid along the groove length, the result of which is groove dryout under a heat load. Grooved evaporator surfaces prepared in demonstration of the invention had measured heat transfer coefficients greater than 1200 Btu/hrft$^2$F using ammonia with 150 grooves/inch.

Condenser shell 51 includes outlet 66 for connection thereto of condensate return 67 for conducting condensed heat exchange medium 15 back to liquid return line 19. Referring now to FIG. 6, condenser shell may further include on the inner surface 69 means 71 in the form of screen mesh or grooves for facilitating the return of any heat exchange medium 15 that condenses on inner surface 69. Perforated condensate collector tube 73 may be disposed axially of condenser shell 51 near surface 69 thereof in communication with outlet 66 for collection and return of condensed heat exchange medium 15. Fibrous wick 75 of conventional wicking material may further be disposed between the outer surfaces of tubular member 55 and collector tube 73 to promote the flow of condensate from exterior surface 64 of tubular member 55 toward collector tube 73 and outlet 66.

Figure 7:
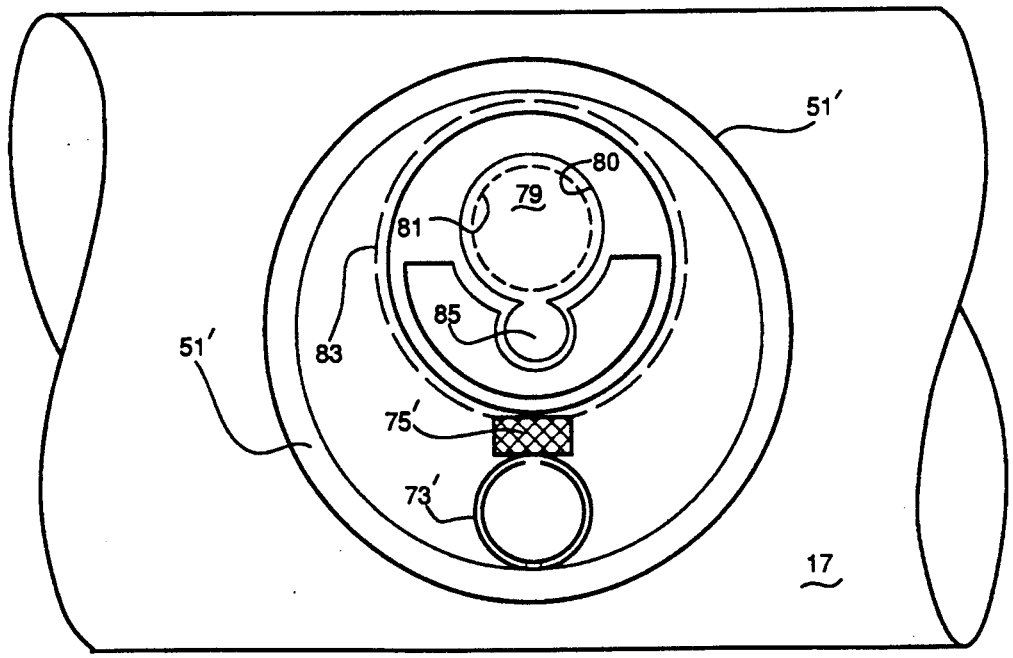
FIG. 7 is a view in section of a heat pipe/manifold configuration alternative to that shown in FIG. 6.

Referring now to FIG. 7, shown therein is a sectional view of a heat pipe/manifold configuration alternative to that shown in FIG. 6. In the FIG. 7 configuration, the structure of condenser shell 51', collector tube 73' and wick 75' remain substantially the same as similarly numbered components of the FIG. 6 configuration. Heat pipe 35' may, however, have an alternative structure including a vapor chamber 79 extending axially of heat pipe 35' and having on surface 80 in the evaporator end of heat pipe 35' a multiplicity of circumferential grooves 81 for performing the function of equivalent grooves 61 of heat pipe 35. Condensation grooves 83 serve the function of equivalent grooves 63 of heat pipe 35. Liquid chamber 85 extending axially of heat pipe 35' conducts condensed heat exchange medium within heat pipe 35' from the condenser end to the evaporator end thereof.

Other high capacity heat pipes such as comprising the monogroove or cat's eye arterial configurations may also find use in radiator 30 of the invention, subject to the limitation that high capacity heat pipes lack priming reliability and do not lend themselves easily to flexible joints.

Sample calculations on heat radiation from two 1×0.9 meter panels 31 were made to show the importance of interface 50 efficiency. Heat radiating surfaces 32,33 of aluminum with surface emittance of 0.82 radiating to cold space and operating at 300° K. with five ⅜ inch OD ammonia heat pipes of the FIG. 6 configuration each with a capacity of 9,000 W-in, dissipate about 1 kW. A temperature 3.7° K. drop at interface 50 is calculated from a cylindrical heat transfer pipe ⅜ inch diameter and 8 inches long with an assumed overall heat transfer coefficient of 1000 Btu/hrft$^2$F. By comparison, conventional interface structures comprising contact thermal resistances and/or conventional evaporation and condensation surfaces having an overall heat transfer coefficient of 100 Btu/hrft$^2$F has a temperature drop of up to about 37° K.

The invention therefore provides a high efficiency heat radiator system. It is understood that modifications to the invention may be made as might occur to one skilled in the field of the invention within the scope of the appended claims. All embodiments contemplated hereunder which achieve the objects of the invention have therefore not been shown in complete detail. Other embodiments may be developed without departing from the spirit of the invention or from the scope of the appended claims.

We claim:

1. A system for radiating heat generated by a source of heat aboard a spacecraft or like vehicle, which comprises:
   (a) a source of liquid first heat exchange medium;
   (b) circulating means for conducting said liquid first heat exchange medium from said source into heat exchange relationship with said source of heat, and for conducting vaporous first heat exchange medium away from said source;

(c) a radiator panel comprising a pair of spaced wall members defining heat radiating surfaces;

(d) a plurality of heat pipes each having an evaporator end and an elongated condenser end and including a second heat exchange medium, each said elongated condenser end disposed within said radiator panel between said spaced wall members and in heat exchange relationship with said heat radiating surfaces;

(e) a manifold having an inlet operatively connected to said circulating means for conducting said vaporous first heat exchange medium from said source into said manifold;

(f) a multiplicity of grooves on the outer surface of said evaporator end of each said heat pipe for promoting condensation of said vaporous first heat exchange medium;

(g) interface means interconnecting the evaporator end of each said heat pipe with said manifold, said interface means including a tubular member enclosing each said evaporator end and defining a vapor flow passageway therearound, said vapor flow passageway communicating with said manifold for conducting said vaporous first heat exchange medium into heat exchange contact with each said evaporator end, said interface means including a liquid outlet for conducting liquid first heat exchange medium from said interface means toward said circulating means;

(h) each of said heat pipes including a flexible portion between said interface means and said panel; and (i) means interconnecting said manifold and said panel for selectively moving said panel between a folded position and a deployed position.

2. The radiator system of claim 1 further comprising a multiplicity of grooves on the inner surface of said evaporator end of each said heat pipe for promoting evaporation of said second heat exchange medium.

3. The radiator system of claim 1 wherein said first heat exchange medium and said second heat exchange medium each comprise a material selected from the group consisting of hydrogen, oxygen, nitrogen, a hydrocarbon, a fluorocarbon, ammonia, water and a liquid metal.

4. The heat exchange system of claim 1 wherein each of said heat pipes comprise a slab shaped wicking element disposed axially of each of said heat pipes and extending between said evaporator end and said condenser end thereof for wicking liquid second heat exchange medium from said condenser end to said evaporator end in the operation of said heat pipes.

5. The heat exchange system of claim 1 further comprising a movable boom supporting said manifold.

6. A system for radiating heat generated by a source of heat aboard a spacecraft or like vehicle, which comprises:

(a) a source of liquid first heat exchange medium;

(b) circulating means for conducting said liquid first heat exchange medium from said source into heat exchange relationship with said source of heat, and for conducting vaporous first heat exchange medium away from said source;

(c) first and second radiator panels each comprising a pair of spaced wall members defining heat radiating surfaces;

(d) a plurality of heat pipes each having an evaporator end and an elongated condenser end and including a second heat exchange medium, each said elongated condenser end disposed within said first and second radiator panels between said spaced wall members and in heat exchange relationship with said heat radiating surfaces;

(e) each of said condenser ends including a flexible portion between said first and second radiator panels;

(f) means interconnecting said first and second radiator panels for selectively moving said second radiator between a folded posistion on said first panel to a deployed position;

(g) a manifold having an inlet operatively connected to said circulating means for conducting said vaporous first heat exchange medium from said source into said manifold;

(h) a multiplicity of grooves on the outer surface of said evaporator end of each said heat pipe for promoting condensation of said vaporous first heat exchange medium;

(i) interface means interconnecting the evaporator end of each said heat pipe with said manifold, said interface means including a tubular member enclosing each said evaporator end and defining a vapor flow passageway therearound, said vapor flow passageway communicating with said manifold for conducting said vaporous first heat exchange medium into heat exchange contact with each said evaporator end, said interface means including a liquid outlet for conducting liquid first heat exchange medium from said interface means toward said circulating means;

(j) each of said heat pipes including a flexible portion between said interface means and said panel; and (k) means interconnecting said manifold and said first panel for selectively moving said first panel between a folded position and a deployed position.

7. The radiator system of claim 6 further comprising a multiplicity of grooves on the inner surface of said evaporator end of each said heat pipe for promoting evaporation of said second heat exchange medium.

8. The radiator system of claim 6 wherein said first heat exchange medium and said second heat exchange medium each comprise a material selected from the group consisting of hydrogen, oxygen, nitrogen, a hydrocarbon, a fluorocarbon, ammonia, water and a liquid metal.

9. The heat exchange system of claim 6 wherein each of said heat pipes comprise a slab shaped wicking element disposed axially of each of said heat pipes and extending between said evaporator end and said condenser end thereof for wicking liquid second heat exchange medium from said condenser end to said evaporator end in the operation of said heat pipes.

10. The heat exchange system of claim 6 further comprising a movable boom supporting said manifold.

* * * * *